United States Patent
DeChant

(10) Patent No.: US 11,213,924 B2
(45) Date of Patent: Jan. 4, 2022

(54) STUCK AXLE HUB REMOVAL ASSEMBLY

(71) Applicant: John DeChant, Bowling Green, KY (US)

(72) Inventor: John DeChant, Bowling Green, KY (US)

(*) Notice: Subject to any disclaimer, the term of this patent is extended or adjusted under 35 U.S.C. 154(b) by 0 days.

(21) Appl. No.: 17/306,682

(22) Filed: May 3, 2021

(65) Prior Publication Data

US 2021/0252651 A1    Aug. 19, 2021

(51) Int. Cl.
  *B23P 19/04*   (2006.01)
  *B62D 65/00*   (2006.01)
  *B25B 27/02*   (2006.01)
  *B25B 27/00*   (2006.01)
  *B60B 29/00*   (2006.01)

(52) U.S. Cl.
  CPC .............. *B23P 19/04* (2013.01); *B62D 65/00* (2013.01)

(58) Field of Classification Search
  CPC ....... B23P 19/04; B62D 65/00; B25B 27/023; B25B 27/0035; B60B 29/008
  See application file for complete search history.

(56) References Cited

U.S. PATENT DOCUMENTS

| | | | | |
|---|---|---|---|---|
| 2,230,918 A * | 2/1941 | Walter | ................. | B25B 27/023 29/256 |
| 2,497,148 A * | 2/1950 | Allen | ................... | B25B 27/023 29/283 |
| 2,821,776 A * | 2/1958 | Keister | ................. | B25B 27/023 29/259 |
| 2,821,777 A * | 2/1958 | Keister | ................. | B25B 27/023 29/259 |
| 3,372,475 A * | 3/1968 | Vickery, Jr. | .......... | H01R 43/027 29/861 |
| 3,568,294 A * | 3/1971 | Conner | ................. | B25B 27/023 29/259 |
| 3,689,978 A * | 9/1972 | Kelso | .................... | B25B 27/023 29/259 |
| 3,696,496 A * | 10/1972 | Corder | ................. | B25B 27/026 29/260 |
| 3,908,258 A * | 9/1975 | Barty | .................... | B25B 27/026 29/252 |
| 4,562,631 A * | 1/1986 | Welch | .................... | B25B 27/023 29/259 |
| 4,769,890 A * | 9/1988 | Maynard | ............... | B25B 27/023 29/259 |
| 5,253,407 A * | 10/1993 | Jamrus | ................... | G21C 19/02 29/266 |
| 6,684,472 B2 * | 2/2004 | Abdelmoula | ......... | B25B 27/023 29/259 |
| 6,883,224 B2 * | 4/2005 | Thomas | ................ | F01D 25/285 29/559 |
| 7,380,324 B2 * | 6/2008 | Young | .................... | B25B 11/02 29/239 |

(Continued)

*Primary Examiner* — Bayan Salone
(74) *Attorney, Agent, or Firm* — Barry Choobin; Patent 360

(57) ABSTRACT

A hub removal assembly for disengaging a hub stuck to an axle. The hub removal assembly includes a rectangular bar having a central sinkhole. An elongated lead screw having a proximal end and a distal end. The proximal end of the lead screw is transversely screwed into the central sinkhole. The distal end of the elongated lead screw is configured as a head that can be turned by a pneumatic tool.

10 Claims, 3 Drawing Sheets

(56) References Cited

U.S. PATENT DOCUMENTS

| | | | |
|---|---|---|---|
| 8,464,411 B2 * | 6/2013 | Betcher | B66F 19/00 29/259 |
| 8,776,339 B2 * | 7/2014 | Betcher | B66F 3/36 29/259 |
| 9,150,048 B2 * | 10/2015 | Rodrigues-Morgado | B25B 27/0028 |
| 9,808,920 B2 * | 11/2017 | Rich | B25B 27/0035 |
| 9,969,214 B1 * | 5/2018 | Gesto | B25B 27/062 |

* cited by examiner

STUCK AXLE HUB REMOVAL ASSEMBLY

CROSS-REFERENCE TO RELATED APPLICATIONS

This application claims priority to the U.S. provisional patent application Ser. No. 62/983,566, filed on Feb. 28, 2020, which is incorporated herein by reference in its entirety.

FIELD OF INVENTION

The present invention relates to an assembly and method for removing a stuck axle hub, and more particularly, the present invention relates to a hub puller for removing a stuck hub without damaging the hub or spindle.

BACKGROUND

Removing a stuck axle hub can be a laborious, time-consuming, and difficult task. A mechanic typically hammers the hub repeatedly to loosen the bonds. Additionally, anti-rust compositions are also used to loosen the corrosion. However, such steps often fail, and the repeated hammering may damage the hub and adjacent components of the axle. The last resort is generally cutting down the hub using a cutting torch. The replacement cost of the whole hub can be high. Moreover, the cutting down of the hub may also damage the spindle increasing both the cost and time of service.

Thus, a need is there for a hub puller that can pull a stuck hub without damaging the hub or axle.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a hub removal assembly that can remove the hub without damaging the hub or axle.

It is another object of the present invention that the hub removal assembly is economical to manufacture.

It is still another object of the present invention that the hub removal assembly is easy to use.

It is yet another object of the present invention that the hub removal assembly is compact and portable.

In one aspect, disclosed is a hub removal assembly that includes a rectangular bar having a central sinkhole. An elongated lead screw having a proximal end and a distal end. The proximal end of the lead screw is transversely screwed into the central sinkhole. The distal end of the elongated lead screw can be configured as a head that can be turned by a pneumatic tool.

In one aspect, the length of the rectangular bar is proportional to the diameter of the hub, and the width of the rectangular bar is proportional to a distance between adjacent bolts of the hub. The rectangular bar can fit between the opposite two pairs of adjacent bolts, such as the proximal end of the elongated lead screw can rest against a hub axle center.

In one aspect, disclosed is a method of removing a stuck hub using the disclosed assembly. At first, the rectangular bar can be mounted between opposite pairs of adjacent bolts while the proximal end of the lead screw rest against the hub axle center. Thereafter, the lug nuts of the opposite pairs of adjacent bolts can be fastened, wherein the nuts can have a flange that rests against the rectangular bar. Once the assembly is mounted tightly on the hub, the lead screw can be turned clockwise, resulting in linear motion of the rectangular bar away from the axle, wherein the hub coupled to the rectangular bar can also be pulled away from the axle.

These and other objects and advantages of the embodiments herein and the summary will become readily apparent from the following detailed description taken in conjunction with the accompanying drawings

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
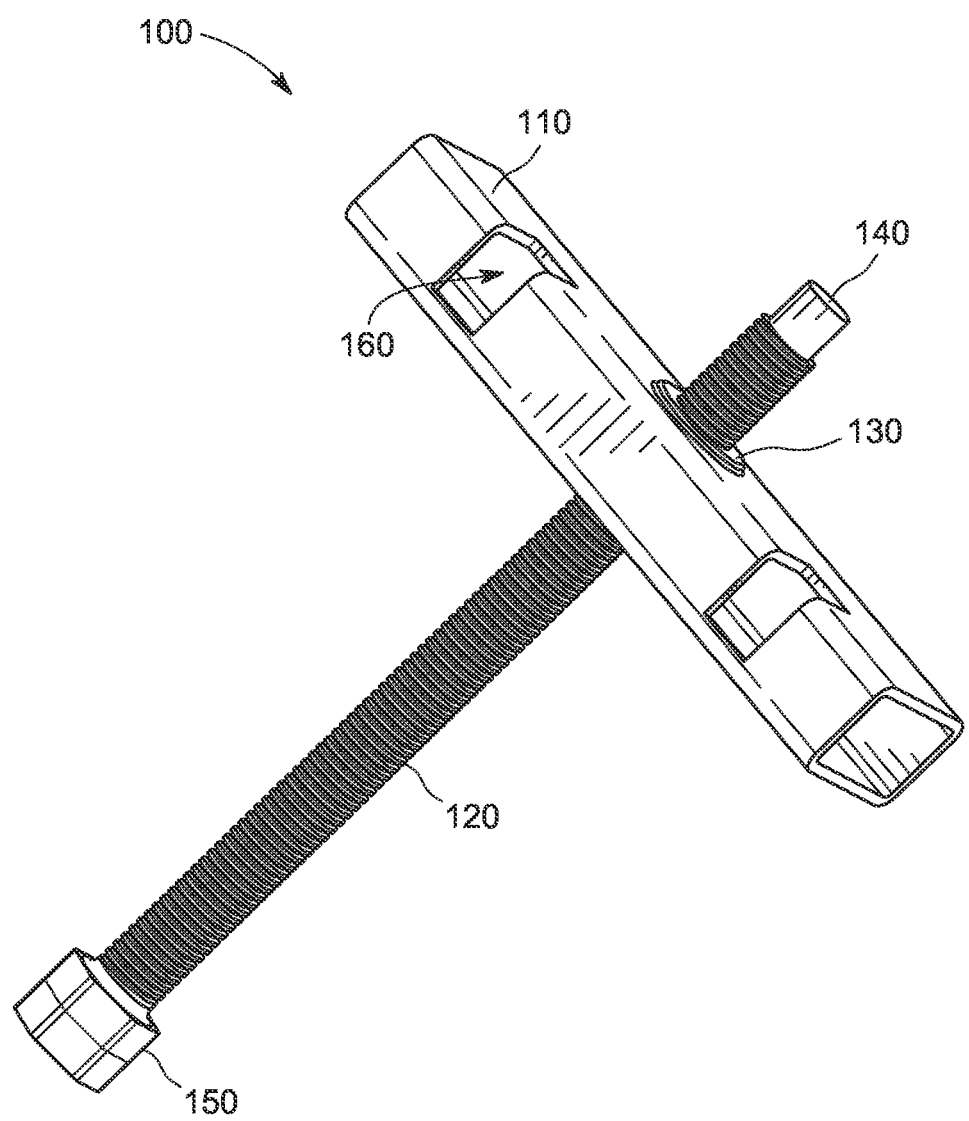
FIG. 1 is a perspective view of the hub removal assembly, according to an exemplary embodiment of the present invention.
Figure 2:
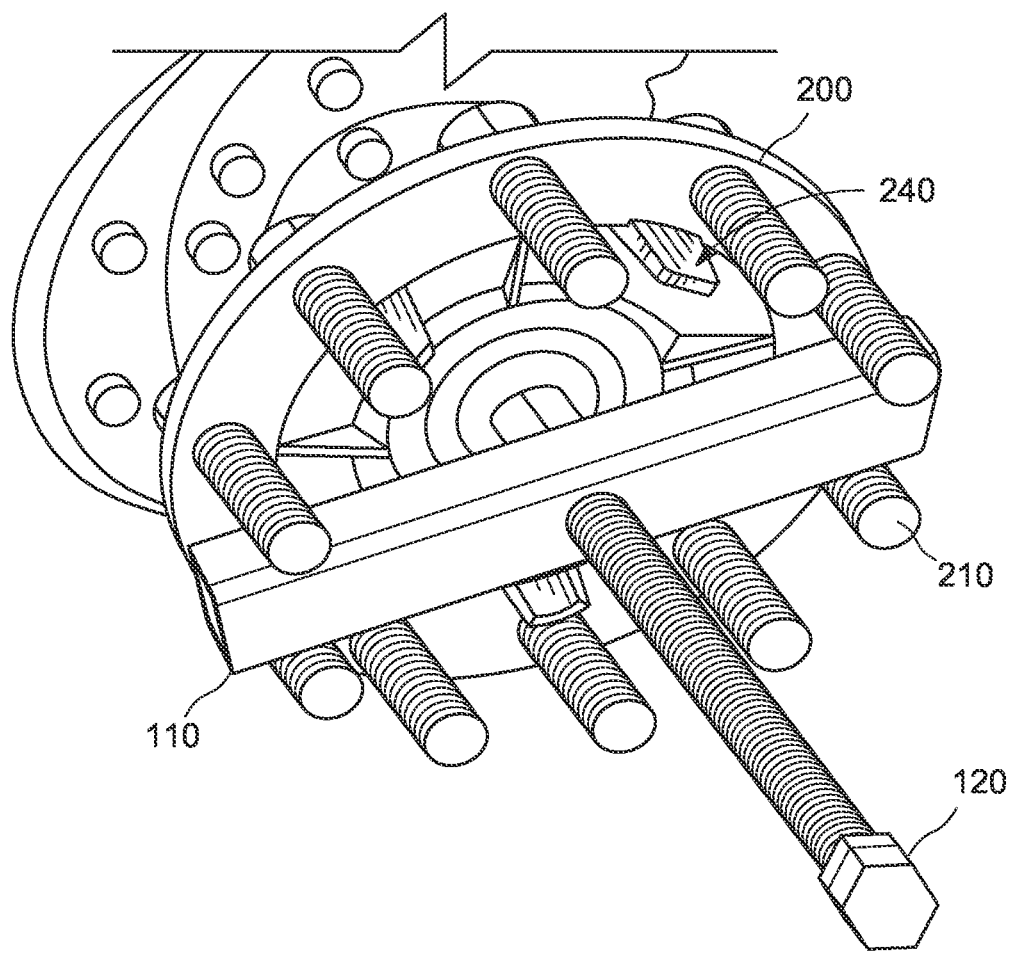
FIG. 2 shows the hub removal assembly mounted on a hub, according to an exemplary embodiment of the present invention.

Referring to FIG. 1 which shows an exemplary embodiment of the disclosed hub removal assembly 100 for disengaging a hub stuck to an axle. The hub removal assembly 100 can include a rectangular bar 110 and a lead screw 120. The rectangular bar 110 can be solid or hollow and made of a rigid and strong material, such as iron. The length of the rectangular bar can be proportional to the diameter of the hub to be removed. FIG. 2 shows the hub removal assembly 100 mounted to a hub 200. The length of the rectangular bar is substantially equal to the diameter of the hub 200. The width of the rectangular bar 110 can be proportional to the distance between two adjacent bolts 210. The width of the rectangular bar 110 allows the rectangular bar 110 to fit between the two adjacent bolts 210. FIG. 2 shows the rectangular bar fit between the opposite two pairs of adjacent bolts 210. The rectangular bar 110 can have a central sinkhole into which the elongated lead screw can be transversely screwed. The central sinkhole can have threads for threadedly engaging the lead screw. Alternatively, a plate having a threaded aperture can be welded to the bottom surface of the rectangular bar, wherein the central sinkhole can be concentric with the aperture of the plate. the bottom surface of the rectangular bar can be in contact with the hub. FIG. 1 shows the plate 130 welded to the bottom surface of the rectangular bar, wherein the threaded aperture of plate 130 is concentric with the central sinkhole.

The lead screw 120 can be of an elongated configuration having a proximal end 140 and a distal end 150. The proximal end 140 of the lead screw 120 can rest against the hub axle center 230. The proximal end 140 of the lead screw 120 can be flat, as shown in FIG. 1. The body of the lead screw 120 between the proximal end and the distal end can be threaded, wherein the threads correspond to the threads in the central sinkhole of the rectangular bar 110. The threads can be such as the turning motion of the lead screw 120 can be translated to the linear motion of the rectangular bar 110. The threaded structure of a lead screw is known in the art for use in linear actuators and jacks. The distal end 150 of the lead screw 120 can have a head, wherein the head can be dimensioned such as it can be engaged to a fastening tool. The fastening tool can be a spanner or a pneumatic tool.

The rectangular bar 110 can also have spaced notches 160 that can be aligned with protrusions of the hub. FIG. 2 shows the hub having protrusions 240 along its inner periphery. The rectangular bar 110 when mounted onto the hub between the bolts can be aligned relative to the protrusions. The protrusions 240 of the hub 200 can be inserted into the notches 160 of the rectangular bar 110.

Figure 3:
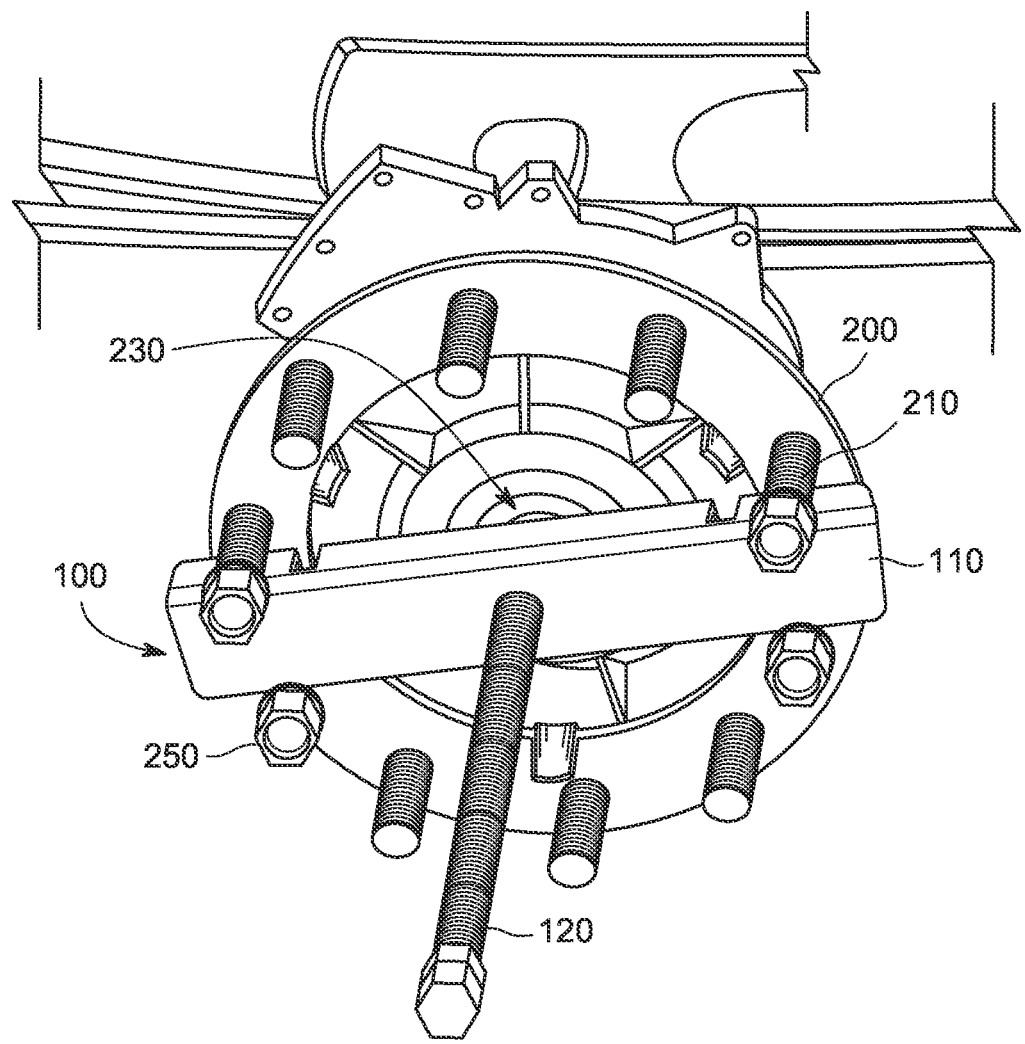
FIG. 3 shows the lug nuts fastened to the bolts securing the hub removal assembly, according to an exemplary embodiment of the present invention.

Also, disclosed is a method for pulling a hub stuck to an axle. The rectangular bar 110 can be mounted onto the hub, such as the rectangular bar 110 fits between the opposite two pairs of adjacent bolts 210, as shown in FIG. 2. The tip of the lead screw 120 can rest against the hub axle center 230 when the hub removal assembly 100 is mounted to the hub 200. Lug nuts 250 of the opposite two pairs of adjacent bolts can then be fastened. The bolts can have sufficient length for fastening the nuts. The nuts can have a flange that can rest against the rectangular bar. The four lug nuts 250 shown in FIG. 3 can be tightened against the rectangular bar 110. The head of the lead screw can then be engaged to an air tool and turned clockwise against the hub axle center. The turning motion of the lead screw against the hub axle center transforms to the linear motion of the rectangular bar. The rectangular bar moves away from the axle, wherein the hub coupled to the rectangular bar also moves away from the axle resulting in releasing of the stuck hub.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A hub removal assembly for removing a hub stuck to an axle, the hub removal assembly comprises:
   a rectangular bar of a length proportional to a diameter of the hub, width of the rectangular bar is proportional to a distance between adjacent bolts of the hub, the rectangular bar having a central sinkhole; and
   an elongated lead screw having a proximal end and a distal end, the proximal end of the elongated lead screw transversely screwed into the central sinkhole, the distal end of the elongated lead screw is having a head configured to engage with a drive tool such as the drive tool can turn the elongated lead screw.

2. The hub removal assembly according to claim 1, wherein the rectangular bar is hollow, a plate with a threaded aperture coupled to a bottom surface of the rectangular bar such as the threaded aperture is concentric with the central sinkhole.

3. The hub removal assembly according to claim 1, wherein the rectangular bar is solid, the central sinkhole having threads that correspond to threads of the lead screw.

4. The hub removal assembly according to claim 1, wherein threads of the lead screw are configured to transform a turning motion of the lead screw into a linear motion of the rectangular bar.

5. A method of removing a hub stuck to an axle, the method comprising the steps of:
   providing a hub removal assembly comprising:
      a rectangular bar of a length proportional to a diameter of the hub, width of the rectangular bar is proportional to a distance between adjacent bolts of the hub, the rectangular bar having a central sinkhole, and
      an elongated lead screw having a proximal end and a distal end, the proximal end of the elongated lead screw transversely screwed into the central sinkhole, the distal end of the elongated lead screw is having a head configured to engage with a drive tool such as the drive tool can turn the elongated lead screw;
   mounting the rectangular bar to the hub, wherein the rectangular bar fits between opposite two pairs of adjacent bolts and the proximal end of the elongated lead screw rest against the axle;

fastening four lug nuts to the opposite two pairs of adjacent bolts, wherein the four lug nuts are tightened against the rectangular bar securing the rectangular bar to the hub;

engaging a drive tool to the head of the elongated lead screw; and turning the elongated lead screw against the axle.

6. The method according to claim 5, wherein the drive tool is a pneumatic tool.

7. The method according to claim 5, wherein each lug nut of the four lug notes is having a flange, the flange rest against the rectangular bar.

8. The method according to claim 5, wherein the rectangular bar is hollow, a plate with a threaded aperture is coupled to a bottom surface of the rectangular bar such as the threaded aperture is concentric with the central sinkhole.

9. The method according to claim 5, wherein the rectangular bar is solid, the central sinkhole having threads that correspond to threads of the lead screw.

10. The method according to claim 5, wherein the lead screw is having threads configured to transform a turning motion of the lead screw into a linear motion of the rectangular bar.

* * * * *